United States Patent

[11] 3,599,407

[72] Inventor Darwin Carl Bichel
East Moline, Ill.
[21] Appl. No. 865,078
[22] Filed Oct. 9, 1969
[45] Patented Aug. 17, 1971
[73] Assignee Deere & Company
Moline, Ill.

[54] DECLUTCHABLE BELT DRIVE FOR COMBINE COMPONENTS
10 Claims, 4 Drawing Figs.

[52] U.S. Cl. .................................................. 56/11.8, 56/14.6
[51] Int. Cl. ................................................ A01d 61/02
[50] Field of Search .................................. 56/21, 20, 19, 23

[56] References Cited
UNITED STATES PATENTS
3,466,854   9/1969   Ashton et al. ............... 86/21
3,481,122  12/1969   Pool et al. .................. 56/21

Primary Examiner—Robert Peshock
Attorneys—H. Vincent Harsha, Harold M. Knoth, William A. Murray and John M. Nolan ABSTRACT: A self-propelled combine has a main separator body with a transverse engine and an operator's station mounted above the front end of the body. The separator drive, which drives the driven components in the separating system, and the header drive, which drives the various driven components on the header, are both driven through a transverse shaft disposed above the main separator body behind the operator's station and the engine. The transverse shaft in turn is driven by the engine through a declutchable belt drive, which includes a drive sheave on the engine output shaft and a driven sheave on the transverse shaft, the end of the shaft on which the driven sheave is mounted being swingable toward and away from the drive sheave to respectively disengage and engage the belt from the sheaves, the swinging of the shaft being controlled by the operator from the operator's station through a mechanical linkage.

PATENTED AUG 17 1971

INVENTOR.
D. C. BICHEL

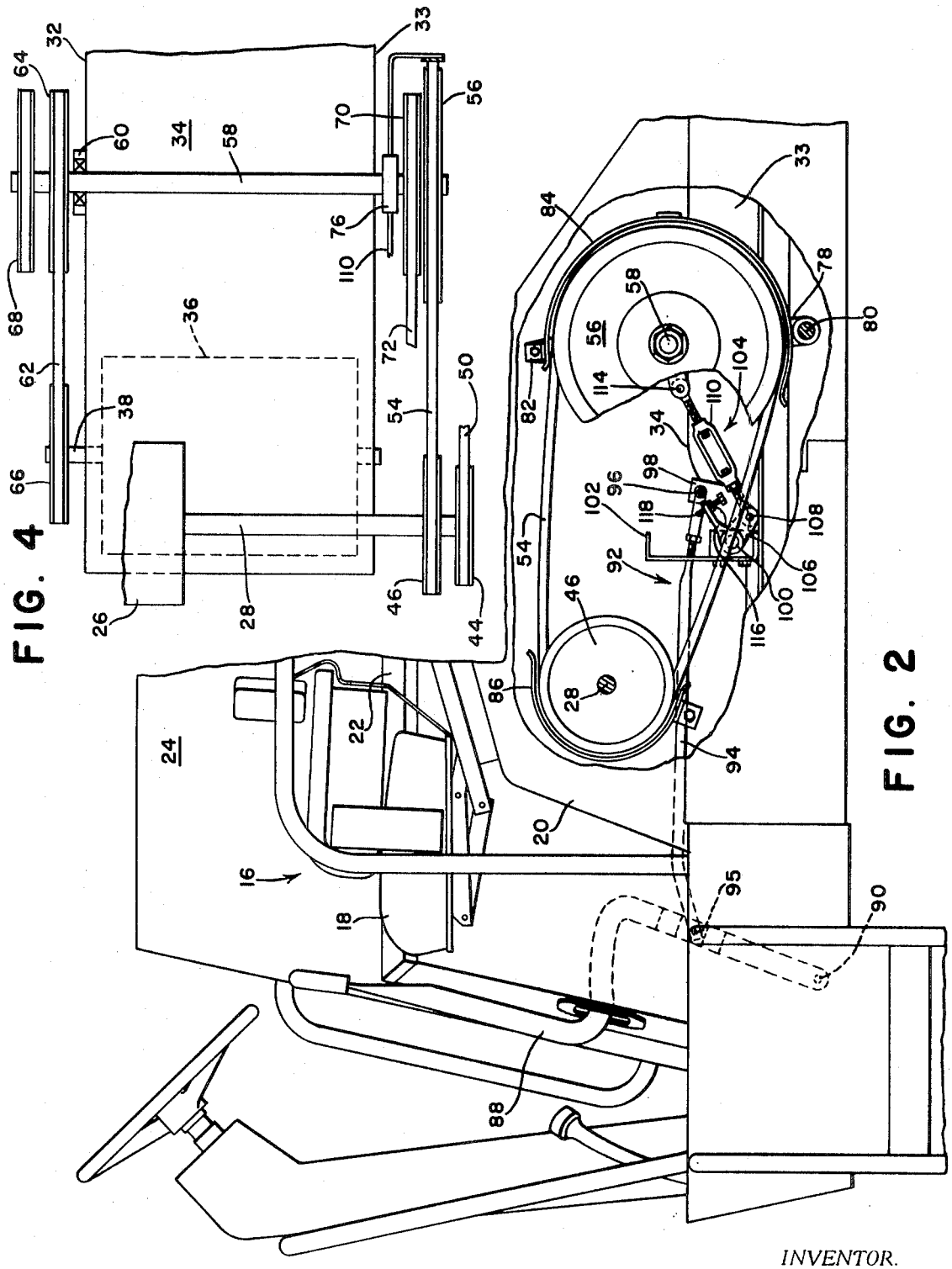

3,599,407

DECLUTCHABLE BELT DRIVE FOR COMBINE COMPONENTS

BACKGROUND OF THE INVENTION

This invention relates to a declutchable belt drive which drives the separating mechanism and the harvesting mechanism on a combine.

A modern self-propelled combine typically has a single internal combustion engine, which powers both the propulsion drive and the drives for the various driven components in the harvesting and separating mechanisms in the combine. Conventionally, belt drives are utilized to drive the harvesting and separating mechanism components, and it is also conventional to provide one or more clutches in the drive lines to the harvesting and separating components so that the combine can be driven without driving the harvesting and separating components, or, where separate clutches are provided in the drive to the harvesting mechanism or header and to the overall harvesting and separator drive system, the harvesting mechanisms on the header can be stopped without stopping the separator drive.

SUMMARY OF THE INVENTION

According to the present invention, an improved declutching arrangement is provided for the belt drives to the harvesting and separating components on a combine. More specifically, the power from the engine to the harvesting mechanism or header and the separator is transmitted through a belt drive having a driven sheave mounted on a shaft, which is shiftable toward the drive sheave to disengage the drive belt from the drive and driven sheaves and thereby disengage the engine from the separator and header drives, the position of the shiftable shaft being controlled by the operator through a mechanical linkage, which includes a control lever at the operator's station.

An important feature of the invention resides in the use of an overcenter mechanism in the control linkage to releasably lock the shaft in its engaged position. Another feature of the invention resides in the arrangement of the shiftable shaft immediately behind and parallel to the engine output shaft with the opposite ends of the shaft being disposed at opposite sides of the main separator body to serve as inputs to belt drives on both sides of the body.

Still another feature of the declutching mechanism resides in its simple and economic construction.

BRIEF DESCRIPTION OF THE DRAWINGS

FIG. 2 is an enlarged side elevation view of the upper forward portion of a combine, showing the declutchable belt drive, in its disengaged position.

FIG. 4 is a schematic plan view of the forward portion of the combine showing the declutchable belt drive and the transverse shiftable shaft which it drives.

DESCRIPTION OF THE PREFERRED EMBODIMENT

Figure 1:
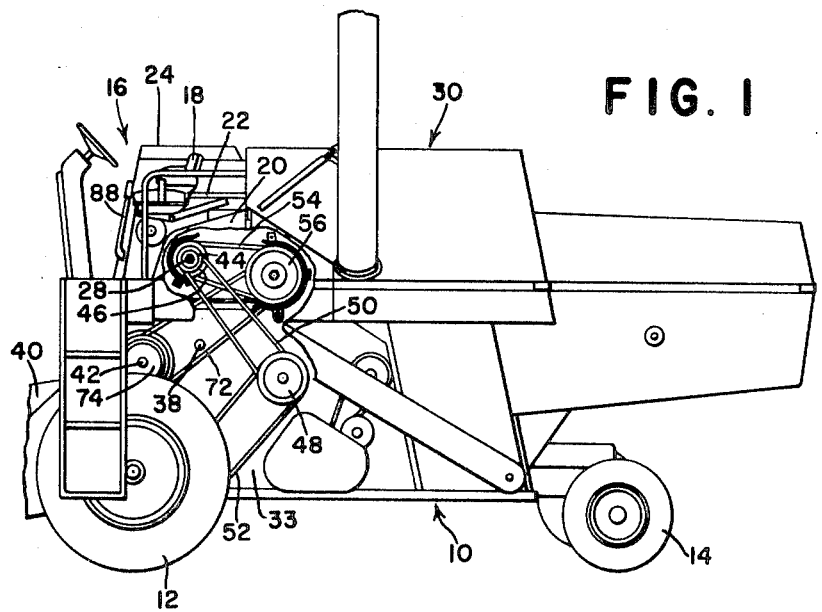
FIG. 1 is a side elevation of a self-propelled combine embodying the invention, with portions of the combine paneling broken away to reveal the declutchable belt drive.

The invention is embodied in a self-propelled combine having a main separator body, indicated generally by the numeral 10, the body being mounted on a pair of forward drive wheels 12 and steerable rear wheels 14. An elevated operator's station 16 is mounted at the front end of the body on the left side of the combine and includes an operator's seat 18 mounted on a raisable hood 20, the structure of the operator's station being described in greater detail in the copending U.S. Pat. application Ser. No. 767,689 and now abandoned, which was also assigned to the assignee herein. It is to be understood that the terms "right" and "left," as well as "forwardly," "rearwardly," etc. are with reference to a person facing in the direction of machine travel (to the left in FIG. 1).

A fore-and-aft extending control console 22 is disposed at the right side of the operator's station 16 adjacent to the seat 18 and separates the operator's station from an engine enclosure 24, which is mounted on the body at the right side of the combine adjacent to the operator's station. An internal combustion engine, which is schematically illustrated and indicated by the numeral 26 in FIG. 4, is transversely oriented within the engine enclosure 24 and has a transverse output shaft 28, which extends toward the left side of the combine under the hood 20.

Mounted on top of the body 10 immediately to the rear of the engine enclosure and operator's station is an elevated grain tank 30, which overhangs both sides of the combine body 10. The combine body has opposite upright right and left sidewalls 32 and 33 respectively, which are disposed inwardly of the opposite grain tank sidewalls and also inwardly of the exterior sides of the operator's station and engine enclosure. The main separator body 10 also has a top 34, immediately below the floor of the grain tank.

As is conventional, a transverse threshing cylinder 36, having an axial shaft 38 journaled in the opposite sidewalls 32 and 33, is mounted within the front end of the body 10 immediately to the rear of the crop inlet opening (not shown), which communicates with a forwardly extending crop feeder house 40, only the rearward portion of which is shown in FIG. 1. As is conventional, the feeder house carries a forward harvesting mechanism or header (not shown), which has a number of crop-handling elements, such as a reel, a cutter bar, and crop-conveying means, which remove the crop from the field and deliver it rearwardly to the threshing cylinder 36 through the feeder house 40. The feeder house and the harvesting mechanism or header carried are conventionally vertically adjustable about a transverse pivot 42 at the forward end of the body 10.

A pair of adjacent drive sheaves 44 and 46 are attached to the outer end of the engine output shaft 28, the outer sheave 44 serving as the input to the propulsion drive, while the sheave 46 serves as the input to the drives for most of the combine's driven crop-handling elements, both on the header and in the main separator body, including the threshing mechanism, the cleaning mechanism, the grain- and straw-handling components and the previously described header elements.

The propulsion drive 44 includes an inversely variable diameter sheave set 48, one sheave of which is connected to and driven by the sheave 44 through a V-belt 50, while the other sheave is drivingly connected through a V-belt 52 to a sheave (not shown), which serves as the input for a transmission for the drive wheels 12, as is well known in the art.

A V-belt 54 is trained around the drive sheave 46 and a driven sheave 56, attached to the left-hand end of a transverse driven shaft 58. The shaft 58 spans the width of the body 10 immediately above the top 34, the opposite ends of the shaft projecting beyond the opposite sidewalls of the body. The right end of the shaft is journaled in a bearing means 60, mounted on the right sidewall 32, and drives the threshing cylinder 36 through a belt drive 62, which includes a drive sheave 64 attached to the shaft 58 outwardly adjacent of the bearing means 60 and a driven sheave 66 on the cylinder shaft. An additional sheave 68 is mounted on the end of the shaft 58 adjacent to the sheave 64 and serves as the input to various belt drives for such driven crop-handling elements as the straw walkers, the cleaning shoe, the straw chopper or straw spreader, and the grain tank-loading system. The belt drives on the right side of the combine are shown in greater detail in copending U.S. Pat. application Ser. No. 773,007, also assigned to the assignee herein.

Also attached to the driven shaft 58 inwardly adjacent to the sheave 46 is a drive sheave 70, which serves as the input to a header drive system including a belt 72 drivingly connecting the sheave 70 to a sheave 74 rotatably mounted on the header pivot 42. The sheave 74, in turn, drives the various crop-handling elements on the header and in the feeder house 40, as is well known in the art.

The left end of the shaft 58 is journaled in a hub 76 carried on a generally upright arm 78, which has its lower end swingably mounted on the left sidewall 33 by means of a transverse pivot 80, whereby the left end of the shaft 58 is swingable in a generally fore-and-aft arc about the axis of a pivot 80. The arm 78 has an upper extension 82 and a rearward extension 83, both of which project from the hub 76 and support a semicircular or C-shaped shield 84 closely encompassing the rearward half of the sheave 56 in the area engaged by the belt 54. A similar C-shaped shield 86 encompasses the forward half of the drive sheave 46 in the area of its engagement with the belt 54.

A control lever 88 is supported on a transverse pivot 90 below the floor of the operator's station and extends through the forward wall of the control console 22, whereby the upper end of the control lever is easily manipulated by the operator from the operator's seat 18.

The control lever 88 is connected to the arm 78 through a linkage, indicated generally by the numeral 92, so that manipulation of the control lever establishes the position of the left end of the shaft 58 and the sheave 56 mounted thereon. The linkage includes a generally fore-and-aft rod 94 having its forward end connected to the control lever 88 by means of a transverse pivot 95 above the pivot 90 and its rearward end pivotally connected at 96 to a crank arm 98 rigidly connected to a transverse rockshaft 100 journaled in a supporting structure 102, which is rigidly attached to the body. The rockshaft 100, is connected to the lever arm 78 through an overcenter linkage, indicated generally by the numeral 104. The overcenter linkage comprises an arm 106 rigidly attached to the rockshaft 100 and connected by a transverse pivot 108 to the forward end of a turnbuckle-type link 110, the rearward end of which is connected to an arm 112 on the hub 76 via a transverse pivot 114. The transverse axes of the rockshaft 100 and the pivots 108 and 114 form the three axes of the overcenter linkage. A stop arm 116 is also attached to the rockshaft 100 and carries an adjustable stop 118 in the form of a bolt threadable in the arm 116, the end of the bolt engaging the supporting structure 102 to limit the movement of the overcenter linkage in its overcenter condition (counterclockwise in FIGS. 2 and 3).

Figure 3:
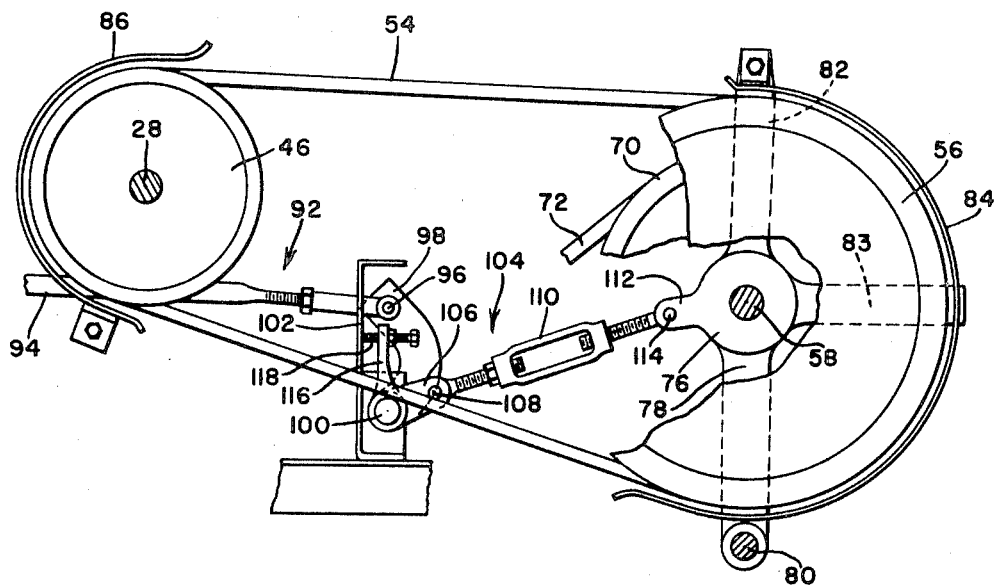
FIG. 3 is an enlarged side elevation view of the belt drive in its engaged position.

In operation, to drive the shaft 58 and consequently the various crop-handling elements driven through the sheaves 70, 64 and 68 mounted on the shaft 58, the control lever 88 is moved forwardly, which pulls the rod 94 forwardly and rocks the shaft 100 in a counterclockwise direction (as shown in FIG. 3). The counterclockwise rotation of the rockshaft 100 is limited by engagement of the end of the bolt 118 with the supporting structure 102, and the bolt is adjusted so that the rockshaft 100 rotates a sufficient distance to place the axis of the pivot 108 above the plane formed by the parallel axes of the rockshaft 100 and the pivot 114. In this overcentered condition, tension in the belt 54, which pulls the arm 78 forwardly, would tend to rotate the rockshaft 100 in a counterclockwise direction since the line of force transmitted through the link 110 lies above the axis of the rockshaft 100. Thus, the belt tension maintains the overcenter linkage in the condition shown in FIG. 3, wherein the links 106 and 110 are almost at their maximum extension, positioning the shaft 58 in its rearward or engaged position, wherein it is spaced a sufficient distance from the engine output shaft 28 that the belt 54 is forced into engagement with the sheaves 46 and 56. This, of course, transmits a driving force to the sheave 56 and consequently to the shaft 58, to drive the various elements driven through the shaft 58. The turnbuckle 110 can be adjusted to vary the position of the arm 78 when the overcenter linkage is extended, as shown in FIG. 3, thereby adjusting the position of the shaft 58 in its engaged position to adjust the belt tension. Adjustment of the bolt 118, as is apparent, permits adjustment of the distance the overcenter linkage 104 will move past its centered condition, so that the overcenter mechanism will be sufficiently over center to prevent inadvertent collapsing of the mechanism during operation of the machine.

To disengage the shaft 58, the control lever 88 is pulled rearwardly, as shown in FIG. 2, whereby the rod 94 moves rearwardly to rotate the rockshaft 100 in a clockwise direction. As shown in FIG. 2, this rotates the arm 106 in a clockwise direction to collapse the overcenter linkage 104, moving the arm 78 and the shaft 58 carried thereby toward the engine output shaft 28. The decreased distance between the centers of the shafts 28 and 58 relieves the belt tension and causes the belt to disengage the sheaves 46 and 56. The shields 84 and 86 limit the distance the belt 54 moves away from the respective sheaves to insure that the belt completely disengages the drive sheave 46.

I claim:

1. In a self-propelled combine having a forward harvesting header, a main separator body, an operator's station and a power source mounted on the body, and crop-handling means mounted within the body and on the header and including a plurality of driven crop-handling elements, the improvement comprising: a drive sheave mounted for rotation about a fixed axis; means drivingly connecting the drive sheave to the power source; a driven sheave mounted on a rotatable driven shaft substantially parallel to the axis of the drive sheave; a shaft-mounting means rotatably supporting the driven shaft on the body for shifting relative to the axis of the drive sheave between engaged and disengaged positions; a control lever mounted at the operator's station for shifting between engaged and disengaged positions; means connecting the control lever to the shaft-mounting means for respectively shifting the driven shaft between its engaged and disengaged positions in response to shifting of the control lever between its engaged and disengaged positions; means drivingly connecting the shaft to at least two of said crop-handling elements; and a drive belt drivingly connecting the drive sheave to the driven sheave when the shaft is in its engaged position, the drive belt being disengaged from at least one of said sheaves when the shaft is in its disengaged position.

2. The invention defined in claim 1 wherein the shaft-mounting means includes a lever arm rotatably supporting the driven shaft and mounted on the body for swinging about an axis parallel to the axis of the driven shaft.

3. The invention defined in claim 2 wherein the means connecting the control lever to the shaft-mounting means includes an overcenter linkage shiftable into an overcenter condition in response to shifting of the control lever to its engaged position to releasably lock the shaft-mounting means in its position wherein it maintains the shaft in its engaged position and into a collapsed condition in response to shifting of the control lever to its disengaged position wherein it moves the shaft-mounting means to a position wherein it supports the shaft in its disengaged position.

4. The invention defined in claim 3 wherein the overcenter linkage includes adjustable stop means for limiting the distance the linkage shifts in its overcenter condition.

5. The invention defined in claim 4 wherein the overcenter linkage includes a first link pivotally mounted on the first pivot, a second link pivotally connected to the lever arm by a second pivot and connected to the first link by a third pivot, the first, second and third pivots being parallel and located in the same plane when the overcenter linkage is in its centered condition.

6. The invention defined in claim 1 wherein the power source includes a transverse output shaft and the drive sheave is mounted on the power source output shaft.

7. The invention defined in claim 1 wherein said crop-handling elements include a cutter bar and a conveyor means mounted on the header for respectively severing the crop from the field and delivering it rearwardly to the main separator body, said drive means including a header drive operative to drivingly connect the driven shaft to the cutter bar and the header conveyor means.

8. The invention defined in claim 1 wherein said crop-handling elements include a threshing cylinder mounted in the main separator body and the drive means includes a cylinder drive operative to drivingly connect the driven shaft to the threshing cylinder.

9. In a self-propelled combine having a power source, a main separator body with opposite upright sidewalls, and a plurality of driven crop-handling elements, the improvement comprising: a drive sheave mounted on the body for rotation about a fixed transverse axis and connected to and driven by the power source; a driven sheave mounted on a transverse driven shaft extending above the main separator body; a drive belt trained around the drive and driven sheaves; bearing means rigidly mounted on one sidewall for rotatably supporting one end of the shaft; means on the other sidewall rotatably supporting said other end of the shaft for shifting between a first position, wherein the belt is stretched around the drive and driven sheaves and transmits a driving force between said sheaves, and a second position wherein the shaft is closer to the drive sheave than in said first position and the belt is disengaged from at least one of said sheaves; means connecting at least one of said crop-handling elements to the shaft; and control means operatively associated with the mounting means to establish the positions of the shaft.

10. The invention defined in claim 9 wherein the power source has a transverse engine output shaft and the drive sheave is mounted on the engine output shaft.